Jan. 28, 1969
J. A. BOTT
3,423,866
FRAME FOR LICENSE PLATE OR THE LIKE
Filed June 6, 1966
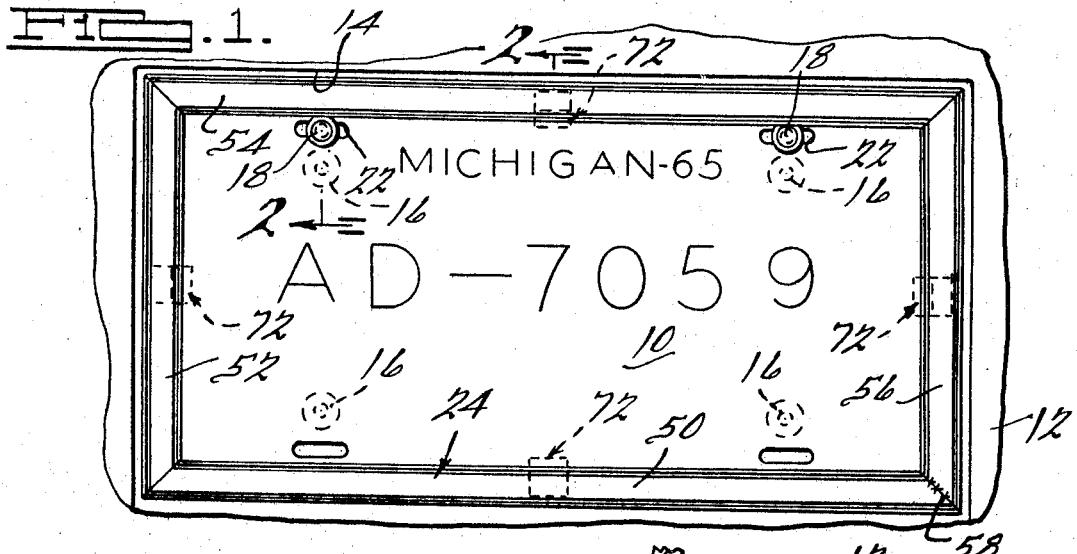
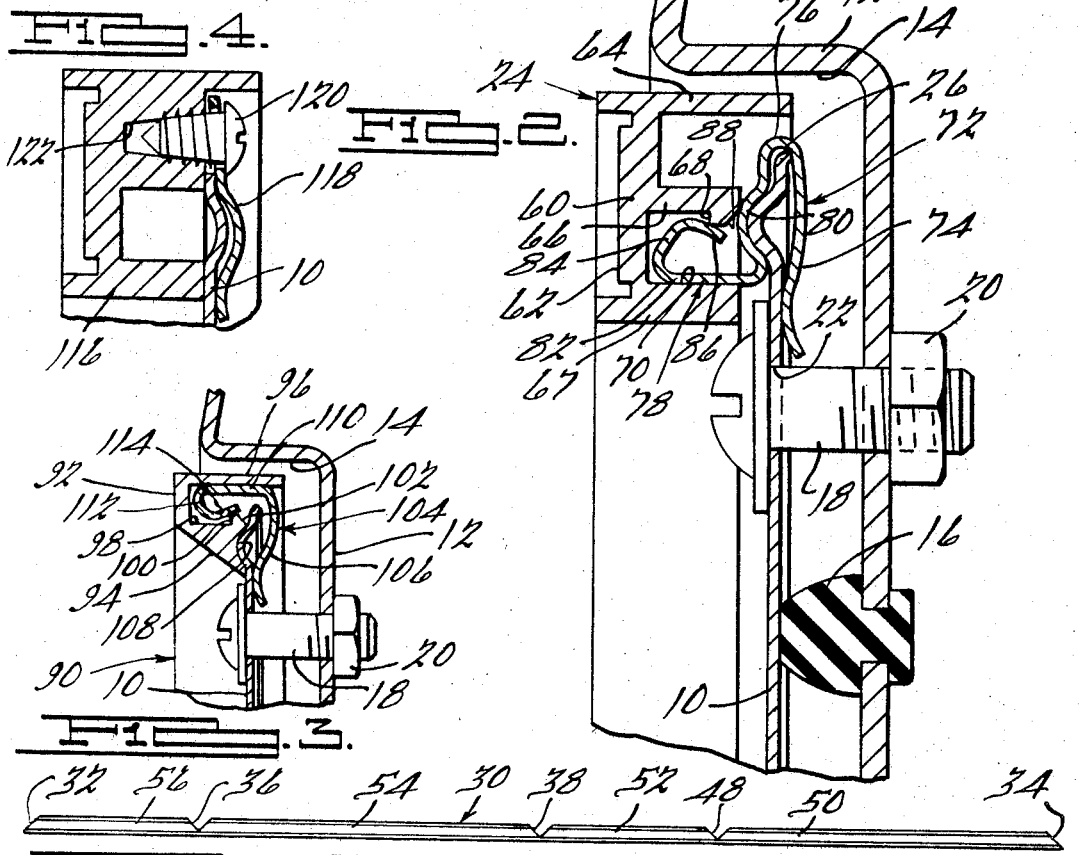
INVENTOR.
John A. Bott.
BY
Harness, Dickey & Pierce
ATTORNEYS.

United States Patent Office 3,423,866
Patented Jan. 28, 1969

3,423,866
FRAME FOR LICENSE PLATE OR THE LIKE
John A. Bott, 931 Lake Shore Drive,
Grosse Pointe Shores, Mich. 48236
Filed June 6, 1966, Ser. No. 560,974
U.S. Cl. 40—209                    7 Claims
Int. Cl. G09f 7/18

ABSTRACT OF THE DISCLOSURE

A license plate frame which may be conveniently made from a single section of extruded aluminum or the like. The extrusion is notched, bent at the notches to rectangular shape, and welded into a one-piece rigid construction. The frame is held on the plate by a plurality of spring clips which are snap-fitted into a channel on the rear side of the frame. The configuration permits assembling of the clips to the frame first and then the snapping of the frame onto the clips without adjusting any portion of the frame per se.

---

This invention relates to frames for license plates or the like.

The objects of the present invention include the provision of a frame for a license plate or the like which is attractive in appearance, which is securely held to the license plate frame by retaining members which are hidden from view, which is inexpensively manufactured, which may be changed in style or appearance with a minimal expenditure of money for new manufacturing tools, which is conveniently assembled to the license plate, which will fit in confined places not much larger than the plate, and which is rugged and durable in construction. These and other objects of the present invention will become apparent from the following detailed description taken in conjunction with the accompanying drawings, wherein:

FIGURE 1 is a fragmentary view of an automobile body panel having mounted thereon a license plate which is provided with a frame constructed in accordance with the present invention;

FIG. 2 is an enlarged sectional view of the structure illustrated in FIG. 1;

FIGS. 3 and 4 are reduced sectional size views of structure similarly illustrated in FIG. 2, showing additional embodiments of the present invention; and FIG. 5 is a view of a strip of material from which the frame of FIGS. 1–4 is manufactured.

Referring now to the drawings, the numeral 10 designates a license plate frame which is shown mounted on a vehicle body panel 12. The plate 10 is positioned within a generally rectangular recess or depression 14 of the panel 12. The panel 12 is provided with a plurality of elastomeric bumpers 16 positioned in the recess 14 and against which the plate 10 is held by a pair of mounting screws 18. The screws 18 are threaded into nuts 20 welded or otherwise secured to the panel 12. The screws 18 will be seen to pass through slots 22 formed in the license plate 10.

The license plate frame itself is designated generally by the numeral 24. The frame 24 extends around the outer margin of the license plate 10 and encloses its outer periphery 26. The frame 24 may be made by several different manufacturing methods, but one preferred method will be described. According to this method the frame 24 is made from a continuous extruded metal strip 30. The strip 30 has its opposite ends 32 and 34 mitered at 45° angles and is provided with three mitered notches 36, 38 and 48 spaced apart between the ends 32 and 34. The notches 36, 38 and 48 define 90° angles between the opposite edges thereof. The strip 30 is adapted to be bent at the notches 36, 38 and 48 into a rectangular frame having a bottom frame portion 50, a side frame portion 52, a top frame portion 54, and a side frame portion 56. The opposite ends 32 and 34 are welded or otherwise joined together as indicated at 58 in FIG. 1.

Turning now to the detailed shape of the strip 30, as it is extruded, this shape is best illustrated in FIG. 2. The strip 30 will be seen to have a frontal wall 60 of varying thickness which is provided with a decorative relief 62 on its front face. An enclosing wall or flange 64 is disposed perpendicularly to wall 60 and extends rearwardly therefrom at the outer periphery of the frame 24. A pair of spaced parallel walls 66 and 67 project rearwardly from the wall 60 to define therebetween a rearwardly facing continuous channel or recess 70. The wall 66 has a lip or shoulder 68 disposed along the rear edge thereof and projecting toward the wall 67.

The frame 24 is secured to the plate 10 by means of a plurality of identical retaining members or spring clips 72. Each spring clip 72 includes a resilient arm 74 at one end thereof which is engageable with the rear face of the plate 10, a generally U-shaped or reversely bent portion 76 which extends around and embraces the outer periphery 26 of the plate 10, and a channel-engaging portion 78 disposed within the channel 70. Each spring clip 72 also has a wall portion 80 disposed between the U-shaped portion 76 and the channel-engaging portion 78 which is conformably engageable with the forward face of the license plate 10 adjacent the outer peripheral margin thereof.

The channel-engaging portion 78 of each spring clip 72 includes a flat portion 82 which is flatly engageable with the wall 67 and is disposed generally perpendicular to the plate 10. The portion 82 emerges with a resilient arm 84 which is inclined outwardly and rearwardly with respect to the portion 82. The arm 84 terminates in a rearwardly and inwardly inclined finger 86. The outer surfaces of the arm 84 and finger 86 serve camming and abutment functions. The inclined finger 86 is engageable with the lip 68 to hold the channel-engaging portion 78 of the clip within the channel 70 while the resilient arm 84 is engageable with an inclined surface 88 formed at the juncture of the rear surfaces of the wall 66 and lip 68 to deflect the arm inwardly and permit it to clear the lip 68 during the installation of the clips 72. The finger 86 normally abuts the lip 68 to hold the clip 72 to the frame 24, but it can wedge its way past the lip to permit removal of the clip from the frame in a manner which will be subsequently explained.

In FIG. 1, one clip 72 is shown positioned at each of the side frame portions 52 and 56 and at each of the top and bottom frame portions 54 and 50, respectively. It is to be understood, however, that a clip 72 need not necessarily be positioned at each of said frame portions. For example, two clips 72 might be spaced apart within the top frame portions 54 and two clips spaced apart along the bottom frame portion 50, with no clips being used at the side frame portions 52 and 56. Irrespective of where the clips 72 are located in the embodiment illustrated in FIGS. 1 and 2, the clips are first installed on the license plate 10. When this is done the resilient arm 74 is sprung away from the wall portion 80 of the clip 72. Thus, the wall portion 80 and arm 74 function resiliently to grip the plate 10 therebetween and hold the clip 72 on the frame 10. Next, the frame 24 may be assembled to the plate 10 and the plate 10 subsequently installed on the vehicle body panel 12 or the reverse of these two steps may be followed. It is preferable to position the license plate 10 on the vehicle first, if it is desired to place a transparent plastic sheet between the frame 24 and the plate. This eliminates the necessity of perforating such a sheet in order to gain access to the heads of the screws 18 during tightening of such screws. If such a sheet is not used, the frame 24 is somewhat more easily installed on the plate 10 prior to the installation of the plate on the vehicle. This is done simply by first installing the clips 72 on the plate 10 and then positioning the frame 24 in front of the plate 10 with the channel 70 in alignment with the channel-engaging portions 78 of the clips and then manually applying a forward force to the rear of the clips 72 and a rearward force to the front of the frame 24. When this is done the arms 84 of the clips 72 will engage the wedge surfaces 88 of the frame 24 and will be deflected inwardly permitting the channel-engaging portions 78 of the clips to snap into the channel 70. In the installed position, the finger 86 of each clip 70 is held under load against the lip 68 to securely position the frame 24 with respect to the clip 72. Similarly, the arm 74 is sprung to hold the frame 24 securely with respect to the plate 10. Accordingly, any rattling or movement of the frame 24 with respect to the plate 10 is prevented.

From the foregoing it will be seen that the clips 72 are entirely hidden from view as the license plate 10 and frame 24 are installed, and the only fasteners or retaining members which are exposed to view are the heads of the screws 18 which would be exposed under any circumstances. It will also be noted from the foregoing that the frame 24 is supported entirely on the license plate 10 and no direct fastenings or connections are made between the frame 24 and the vehicle body panel 12. Because the functional portions of the frame 24, which receive the clips 72 to position the frame on the plate are located on the rear side of the frame 24, the forward face of the frame and all portions of the frame exposed to view may be shaped and styled in accordance with aesthetic considerations and it is not necessary to form the frame with lobes or bosses which project inwardly to receive the screws 18, as has been the custom with many previous license plate frames.

FIG. 3 illustrates a somewhat modified form of the present invention, utilizing a frame 90 which has a frontal flat surface 92, an inwardly and rearwardly beveled frontal surface 94 contiguous to the inner edge of the surfaces 92 and a rearwardly extending flange or enclosing wall 96 extending rearwardly from the outer periphery of the frontal wall 92. The flange 96 forms one side of a rearwardly facing recess or channel 98 of the frame. A lip 100 extends along the inner edge of the recess 98 and is provided with an inclined wedge surface 102 on the rear face thereof. A retaining member or spring clip 104 is shown positioned in the recess or channel 98 and has a resilient arm 106 engageable with the rear face of the license plate 10 to hold it against a surface 108 on the rear side of the frame which is shaped to conform to the license plate 10. The resilient arm 106 projects from a flat portion 110 of the clip 104 and the portion 110 will be seen to lie flatly against the inner surface of the flange 96. The portion 110 carries a resiliently arm 112 at its forward end which extends inwardly and rearwardly from the portion 110 and which terminates in an outwardly and rearwardly inclined finger 114. The arm 112 is engageable with the frame wedge surface 102 to cause inward deflection thereof during the installation of the clip 104 into the channel 98. The finger 114 is engageable with the lip 100 to hold the clip in the channel 98 and to facilitate the removal of the clip from the channel, when desired. It will be noted that the channel-engaging portion of the clip 104, which is defined by the resilient arm 112 and the finger 114, is reversed with respect to the corresponding parts of the clip 72 shown in FIGS. 1 and 2. Furthermore, the clip 104 connects the resilient arm 106 directly to the portion of the clip which projects into the channel 98 and omits any structure corresponding to the reversely bent portion 76 of the clip 72. It will be noted that the frame 90 has the channel 98 thereof positioned adjacent its radially outer edge, thus permitting the beveling of the inner edge of the frame as exemplified by the beveled frontal surface 94. Both the frames 24 and 90 are of uniform cross-sectional shape and, thus, the illustrated sectional views represent the cross-sectional shape of any portions of said frames.

The installation of the frame 90 to the license plate 10 is accomplished prior to the time that the plate 10 is secured to the vehicle body panel 12. This is done by simply laying the frame face down on a flat surface and then laying the license plate on the frame so that the margin of the front of the license plate rests on the rear surface 108 of the frame. The clips 104 may then be inserted into the channel 98 and, when so installed, the arm 106 of each clip will be sprung against the rear face of the plate 10 to firmly hold the frame 90 against the front face of the plate 10. The clearances between the outer edge of the plate 10 and the flange 96 may be such as to require lateral shifting of the plate 10 during the installation of the clips in order to provide sufficient clearance for the arm 112 of a given clip 104 to be moved through the adjacent space between the edge of the plate 10 and the flange 96. The removal of the clips 72 and 104 from the frames 24 and 90, respectively, is easily accomplished by the insertion of a screwdriver or the like under the resilient arm 74 or 106 and prying the clips out of the channel. In the case of the clip 104 some care should be taken to avoid bending the arm 106 and to this end the arm 106 can be held against the plate at its free end. The frame 24 can also be removed by inserting the prying tool between the plate 10 and the flange 64 and prying the plate 10 rearwardly.

Still another embodiment of the invention is illustrated in FIG. 4 wherein a frame 116 is shown held on the license plate 10 by metal retaining members or strips 118. Each retaining member 118 is held to the frame 116 by a self-tapping screw 120 which passes through a hole in the member 118 and is threaded into a continuous channel 122 formed in the rear side of the frame 116. The metal of the frame 116 does not completely surround the threads of the screws 120, but only engages the threads of each screw 120 on the outer and inner sides thereof. However, this is sufficient and a self-tapping screw may be directly threaded into a properly proportioned channel such as the channel 122. In the installed position, the metal retaining strips 118 are desirable under slight load to help prevent undesired movement of the frame 10 and to function somewhat as a lock washer for the screw 120. The frame 116 should be installed on the plate 10 prior to the installation of plate 10 onto the vehicle body.

Reverting once again to the preferred method of manufacturing the frame, it should be pointed out that the notches 36, 38 and 48, extend mainly through the portion of the frame consisting of the walls 60, 66, and 67 and do not completely sever the flange 64 or that portion of the wall 60 in alignment with the flange 64. By this means the thickness of the strip 30 in a direction normal to the line of bend is considerably reduced and the metal is easily bent without distorting the portions of the frame adjacent to the line of bend. At least the outer periphery of the enclosing side wall or flange 64 remains uncut and unites the bottom frame portion 50, the side frame portion 52, the top frame portion 54, and the side frame portion 56 in a neat appearing manner. The bending of the flange 64 may be made very neatly without any undesirable displacement of material and the frame gives the appearance that it was directly formed or cast to the final shape. A similar method can be utilized to form the embodiments illustrated in FIGS. 3 and 4, and the notches are similarly formed in the inner margin of the strip so that the enclosing wall or flange of the strip is left uncut adjacent its outer periphery.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A frame and frame supporting structure for use with a license plate or the like having front and rear faces including a frame extending around the margin of the plate and abuttable with the front face of the plate, said frame having a rearwardly open channel provided with a lip projecting into said channel on one side thereof, and a plurality of retaining members each having a rear wall engageable with the rear face of the plate and biasing the plate toward said frame, said retaining members each having an inclined resilient arm disposed in said channel and provided with an oppositely inclined finger at the free end thereof engageable with said lip to retain said arm in said channel, said lip being operable to engage said arm and said finger to deflect said arm away from said lip upon insertion of said arm into and removal of said arm from said channel, respectively.

2. The structure set forth in claim 1 wherein said retaining members comprise formed metal clips and in which said resilient arm of each said clip comprises a part of a channel engaging clip portion which also engages the side of said channel opposite from said lip.

3. The structure set forth in claim 1 in which said lip is positioned on the outer peripheral wall of said channel.

4. The structure set forth in claim 1 in which said lip is positioned on the inner peripheral wall of said channel.

5. The structure set forth in claim 1 in which each of said retaining members is provided with a portion which engages the front side of the plate and cooperates with said wall to grip the plate resiliently therebetween.

6. The structure set forth in claim 1 in which said channel is located inwardly of the outer periphery of the plate and in which each retaining member is provided with a portion extending outwardly from the channel to the outer periphery of the frame and around the outer periphery of the frame to said rear wall.

7. The structure set forth in claim 1 in which said frame is made from a continuous metallic extrusion of substantially uniform cross-section which defines each of the sides of the frame.

References Cited

UNITED STATES PATENTS

| | | | |
|---|---|---|---|
| 2,521,603 | 9/1950 | Prew | 40—152 |
| 2,581,843 | 1/1952 | Edwards | 40—156 X |
| 1,913,000 | 6/1933 | Woller | 40—209 |
| 2,138,124 | 11/1938 | Schnell | 40—209 |
| 2,194,106 | 3/1940 | Wiley | 40—209 |
| 3,173,219 | 3/1965 | Yarder | 40—129 |
| 3,318,031 | 5/1967 | Whaley et al. | 40—129 |

EUGENE R. CAPOZIO, *Primary Examiner.*

WENCESLAO J. CONTRERAS, *Assistant Examiner.*

U.S. Cl. X.R.

40—156